United States Patent Office
2,936,233
Patented May 10, 1960

2,936,233
ZINC RECOVERY

Eugene Wainer, Cleveland Heights, Ohio, assignor to Horizons Incorporated, Cleveland, Ohio, a corporation of New Jersey No Drawing. Application December 16, 1957
Serial No. 702,793

9 Claims. (Cl. 75—86)

This invention relates to the preparation of high purity zinc metal from source materials in which zinc, present either in elemental or combined form, is associated with a substantial amount of metallic and non-metallic impurities which are difficult to separate from the zinc and which therefore seriously interfere with the recovery of the zinc content of the source materials. More particularly the invention relates to a process in which impure zinc metal associated with a substantial content of oxide and salt contents is readily converted to high quality metal in a simple and direct manner.

In the more modern approaches to the formation of pure zinc metal, zinc oxide and carbon is heated in a blast type furnace operated at temperatures above the boiling point of zinc. The metal is recovered by condensing the fume of zinc thus produced in a bath of molten zinc maintained at a specific temperature. The raw material aspects of the zinc industry, however, are such that a larger and larger proportion of the burden which must be fed to such a furnace is composed of residues and scraps obtained as a result of the commercial utilization of zinc metal. A very large proportion of such scrap residues, amounting to several tens of thousands of tons per year, are contaminated with the chlorides and oxides of zinc, ammonium chloride, and the chlorides and oxides of other metallic impurities.

When these scrap residues constitute part of the burden in the feed to a conventional commercial blast furnace, all of these chlorides boil out of the reaction mass substantially unchanged with the result that the operation of the furnace is seriously hindered, the end product is contaminated to an unsalable condition, and equally seriously, heavy losses are incurred of valuable products in the form of fumes of the chlorides of these metals. In many cases, these losses are so profuse that zoning restrictions prevent the use of the equipment in agricultural or urban areas.

A principal source of valuable zinc residues stems from galvanizing operations in which iron or steel is surface coated with metallic zinc by passing the ferrous article through a bath of molten zinc in either a continuous or batch process. In order for the galvanizing operation to work properly, the molten zinc is covered with a heavy coat of a specially prepared flux which is periodically skinned and replaced. This flux is composed chiefly of a mixture of anhydrous zinc chloride and ammonium chloride in which the ammonium chloride content usually utilized varies from 5 to about 25 percent, a content of 8 percent being preferred. An analysis of such a preferred flux in unused condition will be approximately as follows:

43% zinc
49% chlorine
7% ammonia
Balance consists chiefly of water

The exhausted flux skimmed from the surface of the equipment is designated in the trade as "sal skimmings" generally having a total zinc content of approximately 50 percent and the balance consists of chlorides and oxides of various impurities of which zinc is a part. Table 1 sets forth an exemplary analysis for such skimmings.

TABLE 1

Sal skimmings

| | Percent |
|---|---|
| Zn metal | 5.6 |
| ZnO | 27.4 |
| $ZnCl_2$ | 48.0 |
| $NH_4Cl$ | 3.1 |

Balance chlorides and oxides of Fe, Pb, Al, Cd and $H_2O$.

Another source of zinc scrap material adapted to be processed in accordance with the teachings of my invention is designated as zinc skimmings. When zinc metal or an alloy of zinc, such as brass, is melted for the production of merchants' shapes, die castings, and the like, the normal practice is to use a very thin covering of flux composed chiefly of anhydrous zinc chloride whose purpose is to dissolve any oxide which might form and also to prevent its ready formation. Periodically the surface of the melting pot is skimmed to insure maintenance of the molten metal in its highest stage of purity and the flux cover is replaced. Such skimmings are an important source of zinc in scrap form. Table 2 sets forth the analysis of typical material obtained from this source.

TABLE 2

Zinc skimmings

| | Percent |
|---|---|
| Zn metal | 35.2 |
| ZnO | 50.8 |
| $ZnCl_2$ | 5.8 |
| $Fe_2O_3$ | 3.6 |
| PbO | 1.8 |
| $Al_2O_3$ | 0.9 |
| Others | 1.9 |

The recovery of the zinc values in such residues is difficult even when the residue is relatively uniform but sometimes the situation is aggravated by improper control at scrap collection points and the two types of zinc residues given in Tables 1 and 2 may sometimes be presented to the zinc smelter in mixed form.

Previous efforts to recover the zinc from these residues, by melting in conventional furnaces or even as feed to a blast or retort type of furnace, have met with little success. Any metallic zinc which is present is prevented from melting into coalescent form by the sheathe of contaminants with which it is associated. A more important difficulty is the inability to reduce the zinc chloride and other metallic chlorides by traditional techniques with the consequent loss of zinc values as in the form of chloride fumes. The evolution of such fumes is further undesirable because it has an adverse effect on the efficiency of the entire operation due to the blocking of channels in the equipment.

A variety of chemical and pyrometallurgical techniques have been tried in an attempt to resolve this problem, none of which has met with unqualified success either for technical or economical reasons. Such methods include heating at a high temperature to distill out the zinc chloride which is then recovered for further use. Due to the hydration of the residue before distillation, only a portion of the zinc chloride can be recovered and the problem of the zinc oxide residue still remains. Chemical methods have been employed involving treatment with acid or salt fluxes. These have failed for economical reasons. Invariably, these procedures result only in the formation of zinc compounds and are ineffective for the preparation of zinc metal.

I have now discovered still another method of treating contaminated zinc metal containing materials of the foregoing description by a combination of chemical and physical means to convert such materials to a commercial high purity grade of zinc metal. I found my process to be effective particularly in the treatment of residues containing metallic zinc and zinc oxide and containing substantial amounts of halide salt contaminants such as ammonium chloride, zinc chloride, and other metal chlorides, as for example, zinc skimmings of analysis comparable to those given ranging from Table 1 to Table 2, so that all of the zinc value is made available in metallic form without loss, and such zinc is in a high state of purity.

Briefly in my process, the zinciferous starting material is reacted with certain basic treating agents and reducing agents in a fused salt melt. While I prefer to carry out the process as two separate steps, it is also possible to accomplish the reaction and reduction in a single operation. The basic materials employed as treating agents are effective in separating the chlorides from the metallic portion of the residues and the resulting product has been found to be readily susceptible to further treatment to recover the zinc values in the system, in the form of a vapor. The vaporization of the zinc is preferably accomplished by the use of a fused salt melt as the heat carrier.

The treating agent used to effectively separate the chloride contaminants from the zinc metal is calcium oxide, preferably in the form of burned lime. While other forms of lime such as quick lime or limestone may be used, the burned lime is preferred. Other basic materials such as burned dolomite or magnesia may be substituted in whole or in part for the calcium oxide, but for reasons of economy and ease of operation I prefer lime (CaO) which is available commercially in sufficient purity for the purpose. When operated with the added base, the process is so conducted that the chlorides of zinc and other metals react with the calcium oxide to form the oxides of zinc and these other metals yielding calcium chloride as a byproduct. The metallic zinc and zinc oxide portions of the scrap pass through the reaction unchanged, leaving an end product consisting of a mixture of zinc, the oxides of zinc and other impurities, and the chlorides of calcium and magnesium. If a reducing agent is then brought into the system or if reducing conditions are maintained in the system under certain conditions to be described hereinafter, the zinc compounds which are now in a reducible condition are reduced to metal and recovered by volatilization in the same manner as the metal originally present in the residue being processed.

After it has reacted with the addition of a basic oxide described above, I provide a suitable melt in which the zinc residue may be processed. This melt is composed primarily of alkaline earth halides, preferably chlorides. Of these, anhydrous calcium chloride is preferred, although magnesium chloride or mixtures of magnesium chloride and calcium chloride may be used. In some instances, alkali chlorides such as those of sodium or potassium may be added to reduce the melting point of the fused salt, though this is not normally necessary.

The essential characteristics of the halide melt are an ability to remain stable, that is, to remain molten without excessive fuming at temperatures and pressures at which the zinc may be evolved from the melt as a vapor, plus an ability to scavenge to some extent oxides and other impurities associated with the crude material to be refined, and, finally, a reasonable chemical inertness toward both the reducing agent and the zinc products. The alkaline earth chlorides are available commercially of a requisite purity and possess the desired combination of properties and form suitable melts.

The fused salt baths I prefer to use are those which are essentially inert chemically towards zinciferous nonmetallic compounds, particularly oxide, and thus my preferred baths are essentially only carriers which act as dispersants for the reactants under well controlled temperature and dispersion conditions. When the fused salt baths are pronounced solvents for the zinciferous compounds, not only is it more difficult to remove zinc as metal by reduction and distillation, but the salt bath tends to accumulate soluble contaminants which will eventually reduce its efficiency to the point where it soon must be discarded. In the absence of such manifest chemical fluxing agents, the bath may be used substantially indefinitely.

I have found further that the treatment of these zinc residues with calcium oxide must be handled in such a manner that little or none of the calcium oxide finds its way into the fused salt bath or is disposed in such a condition that immediately on contact with the fused salt bath, it will react with the zinc chloride residues. If substantial quantities of calcium oxide are fed directly to the fused salt bath in unreacted form, the mass tends to become pasty and as a result of the substantial increase in viscosity great difficulty is encountered in maintaining proper turbulence for suitable mixing. If the situation is allowed to continue, the fused salt bath becomes so pasty that it must be removed from the reaction zone in order to prevent a complete stoppage of the process.

I have found further that a mixture of solid and gaseous carbon products must be utilized under specific reducing conditions in order for the process to operate at high efficiency. While varieties of solid carbon may be utilized such as coal, coke, petroleum coke, lampblack, and the like, the preferred variety of carbon is petroleum coke in fine mesh size. The preferred gaseous reducing agent is a hydrocarbon such as distilled oil or natural gas. Producer gas consisting of a mixture of carbon monoxide and hydrogen may be used, but it is somewhat less effective than natural gas consisting chiefly of methane, for example.

When the reduction is carried out in a fused salt medium, I have found that solid carbon alone is only partly effective in reducing the oxidic components of the bath to metal and the efficiency of gaseous reducing agents is also extremely low. Only a suitable combination of solid and gaseous reducing agents has been found to provide yields approaching 100%. If the gaseous reducing agent is used in excessive quantities so that it cracks forming solid carbon particles and hydrogen, again the efficiency of reduction is sharply reduced. Though the reason for this reduction in efficiency appears to be somewhat obscure, it appears that such cracking takes place over the surface of as yet unreduced zinc oxide particles and prevents the proper interaction of solid and gaseous reducing agents so that full efficiency may be maintained. If an excess of solid carbon is used and a deficiency of a gaseous reducing agent, there is a tendency to form blue zinc as the result of reoxidation by carbon dioxide or water vapor in the fume. It had been found that by proper regulation of the relative ratios of the solid carbon reducing agent and the gaseous carbonaceous reducing agent that not only is the efficiency of reduction maintained close to 100% but that the resulting gases are primarily carbon monoxide mixed with more or less hydrogen. These mixtures are not oxidizing agents for zinc in the vapor state, and thus do not produce the types of deleterious product known as "blue" zinc.

It has been established that if the amounts and ratios of carbon gaseous reducing agent are equal to or not more than about 50% above the theoretical as defined in the following equation, the high efficiency of reduction is maintained, there is substantially no cracking of the hydrocarbon reducing agent, and little or no formation of the "blue" zinc variety.

$$2ZnO + C + CH_4 \rightarrow 2Zn + 2CO + 2H_2$$

The important aspect of such a ratio of reactants is the prevention of formation of carbon dioxide or water vapor. In effect, this ratio of reactants stops the oxidation of carbon at the carbon monoxide level.

In a preferred embodiment of my invention, I feed zinc skimmings of either of the types described above, or mixtures thereof, petroleum coke and burnt pebble lime to a closed circuit dry grinding system. The dry grinding system may be a ball mill or a rod mill in which the lining is composed of acidproof porcelain and the balls used for the grinding medium are silica ganister or porcelain. Acid-proof steels may be used also both for the lining and for the balls. The closed circuit dry grinding system is fitted with continuous feeding and discharge mechanisms. As a result of the grinding of the ingredients listed, an exothermic reaction takes place. If these are fed rapidly, temperatures as high as 500–600° C. are achieved and incipient fusion will sometimes take place. Consequently the feeding to the mill is regulated so that the temperature does not exceed approximately 500° C. Even under these conditions, residual metallic zinc tends to fuse and as a result of the grinding action is thoroughly dispersed through the mass in the form of minute droplets, the residual mass being effectively solid.

All of the ingredients fed to the ball mill are extremely friable and are broken down to fine mesh sizes of the order of —20 mesh within a matter of minutes. The reaction between the calcium oxide and the acid chlorides takes place almost completely in this stage of the operation. The thoroughly mixed, fully reacted, finely divided reaction mix while still hot is then fed to the reduction zone utilizing the fused salt bath. The purpose of the hot feeding is to retain as much of the heat present in the reactants, as possible, for economical purposes.

The reaction zone consists of an enclosed crucible made of graphite, silicon carbide, or a ceramic material. Covering the crucible or reaction zone is a manifold for introducing any desired solid, liquid, or gaseous material into the space above the melt, and for introducing any such similar materials into the melt itself. In addition, the manifold also contains inlets for tubing leading to the bottom of the melt so that a reducing gas may be sparged into the melt as desired.

As indicated in the description, the preferred fused salt bath is calcium chloride which is maintained at a temperature between 900° and 1100° C. The mixture of coke and the reaction residue of calcium oxide and the skimmings are fed continuously at a predetermined rate into the fused salt bath and, at the same time, the bath is maintained in a state of turbulence by sparging with the hydrocarbon gas. Reduction of the zinc oxide and its attendant volatilization takes place almost immediately and this zinc vapor is passed to a suitably constructed condenser for recovery purposes. Substantially 100% efficiency is obtained in production of zinc of high purity.

In view of the fact that calcium chloride is being continually added to the salt bath, periodically a portion of the salt bath is drained off from a suitably disposed bottom valve to maintain a reasonable level of fused salt inside the reaction container. This drain is accomplished by stopping the flow of materials of solid form for a few minutes while the gas sparging still continues, then stopping the gas sparging for a few minutes, and finally draining to recover level.

While the technique described is the preferred procedure, it is also possible to feed the solid reactants separately providing they are first placed into a —20 mesh form. In this case, screw feeders are used, one for each of the ingredients. These feeders are arranged so that mixing is obtained in a channel just prior to entry into the salt bath. While this procedure is effective, it requires much closer control of feeding of ingredients than is otherwise necessary.

The amount of lime used is substantially theoretical, being the amount necessary to react completely with all of the acid chlorides present. If calcium carbonate is used, it may be handled in the ball mill as previously described or may be fed directly to the fused salt bath. In the event that it is fed directly to the fused salt bath, it is allowed to react for a period sufficient to decompose the calcium carbonate to calcium oxide, and the carbon dioxide is swept out of the chamber. While this is not a desirable procedure, it may be utilized if the precaution indicated is taken.

The amount of petroleum coke used is just about theoretical or up to about an amount not exceeding 50% in excess and preferably not exceeding 10% in excess. Sparging gas is fed in under pressure and again an amount close to theoretical is preferred, and in practice an amount equivalent to about a 10% excess is properly utilized.

The process as described is a continuous one in that as a result of the periodic draining of calcium chloride due to its continuous introduction non-volatile oxides and metals such as those of iron, aluminum, and silica are being continuously moved from the salt bath since these do not pass over in the fume with the zinc product. On this basis, a highly effective substantially continuous technique is obtained.

The example which follows is illustrative of a single laboratory run, but is obviously capable of being modified so as to be run for an indefinite period.

EXAMPLE I

In this example, zinc skimmings of the analysis given in Table 2 serves as the impure raw material from which the zinc values are recovered. After mechanical crushing, these zinc skimmings are made available in —20 mesh form.

In a porcelain lined ball mill filled with porcelain balls and a vent for the escape of gas, 1000 grams of these —20 mesh skimmings are ground with 50 grams of calcined petroleum coke and 27 grams of burnt lime. The coke and lime contents in both cases represent a very slight excess over theoretical.

The batch is ground in the ball mill for 30 minutes, after which all of the ingredients have been reduced to —20 mesh and a temperature of approximately 80° C. is obtained. The ground batch is removed from the ball mill and immediately placed in the fore chamber of a screw feeder attached to a reaction vessel. The reaction vessel is an enclosed crucible made of silicon carbide in which 5,000 grams of calcium chloride has been previously melted and is being maintained at a temperature of 975° C. All air and water above the molten calcium chloride had previously been purged with argon. The reaction vessel is fitted with a tube so that gas may be sparged through the cover into the bottom portions of the fused salt. In addition, the reaction vessel is also fitted with a short wide diameter side arm maintained at a temperature of approximately 800° C. which leads thence into a condensing chamber maintained as closely as possible to approximately 525° C. The side arm leads to the bottom of said condensing chamber which is the form of a long tube in which the length is very much greater than the diameter. Only the bottom half of this tube is maintained at the condensing temperature indicated, and the top half grades off until room temperature is reached.

While maintaining the temperature of the bath at 975° C. by suitable means (in this case external resistance heaters), the fully reacted and comminuted zinc raw material is fed continuously to the surface of the salt bath over a period of one hour. At the same time, methane is sparged into the bath at a pressure of ten pounds per square inch, being led to the sparger through small orifices. The diameter of the sparger tube is 0.25 inch. During the course of the one hour, 5½ cubic feet of methane are utilized, this volume having been determined at atmospheric pressure.

In order to determine overall efficiencies, the flow of natural gas is then replaced with argon in order to sweep all zinc remaining as vapor in the side arm into the condenser. After approximately ten minutes of such argon sparging, the reaction vessel and condenser was allowed to cool to room temperature and the zinc recovered from the condenser. Approximately 95% of the zinc was recovered from the condenser in coherent solid form and the balance as dust condensed on the walls of the condenser slightly above the molten mass of zinc.

A total of 775 grams of zinc metal was recovered equivalent to an overall yield of approximately 98.5%.

The analysis of this recovered metal (in percent by weight) was as follows:

| | Percent by weight |
|---|---|
| Zinc | 99.6 |
| Aluminum | 0.003 |
| Lead | 0.14 |
| Cadmium | 0.03 |
| Iron | 0.02 |
| Tin | 0.001 |

This analysis is equivalent to high purity zinc of commercial quality.

EXAMPLE II

Again the example which follows is illustrative of a single laboratory run, but is obviously capable of being modified so as to be run for an indefinite period.

The same equipment and procedure as described in Example I was followed in this case except that the raw material utilized was in accordance with the analysis given in Table 1. In this particular case, 1000 grams of "sal" skimmings were first ground to —20 mesh in a roll crusher. This was thereafter mixed with 225 grams of burnt pebble lime and 55 grams of calcined petroleum coke and the mass was then ground in the ball mill described previously for 30 minutes, after which a reaction mixture having a particle size less than 20 mesh was made available. The temperature of this reaction mixture was approximately 300° C. Again, this material was fed into a fused salt bath containing 5,000 grams of calcium chloride at a temperature of 975° C. as before, this feeding taking place over the course of an hour. At the same time, 5½ cubic feet of methane as measured at atmospheric pressure was sparged into the reaction mass over a period of an hour at a pressure of ten pounds per square inch, and the zinc collected in the condenser as before. Again at the end of the one hour period, the reaction vessel was swept with argon and after cooling, 495 grams of zinc metal was recovered from the condenser equivalent to a yield of approximately 98% of theoretical.

In a related application, Serial No. 656,497, which was filed May 2, 1957, and which issued on July 22, 1958, as United States Patent 2,844,462, there is described a process which is similar in many respects to that forming the present invention. My process constitutes an improvement thereover in the use of calcium oxide to separate chlorides from the melt in the residue which constitutes the charge of zinc-containing feed in the process, the manner of handling the calcium oxide, the combination of specifically chosen reducing agents in specific amounts and the manner of handling such reducing agents.

The process may be varied without departing from the spirit of my invention. For example: The reaction between the burnt lime or calcium carbonate and the sal skimmings is carried out initially in the ball mill as indicated. The mass is then digested with water in the ratio of 10 parts of water to one part of solid and the pH adjusted to a pH of 6.5 with lime or HCl as may be needed. After lengthy digestion, the mass is filtered and washed. The chlorides are thus removed as calcium chloride and the residue would consist of a mixture of zinc hydrate and metallic zinc, all of the zinc being recovered in these two forms. This material may be utilized as feed to the fused salt after heating to drive off free and combined water.

I claim:

1. A process for producing zinc metal which comprises: simultaneously mixing and reacting a basic material from the ground consisting of lime, calcium carbonate, magnesia, dolomite, and mixtures thereof with a zinciferous material having a substantial halide and oxide content and selected from the group consisting of zinc drosses, zinc residues, zinc skimmings and reducible zinc compounds, by dry grinding said materials together; maintaining the temperature below 500° C. while effecting an exothermic reaction between said materials during said dry grinding; introducing the resultant product into a melt consisting essentially of at least one molten alkaline earth halide; contacting the melt containing the introduced reacted starting material with a mixture of solid and gaseous carbonaceous reducing agents to reduce zinc oxide in said reacted material to metallic zinc; and recovering the metallic zinc from vapor evolved from the melt.

2. The process of claim 1 wherein the melt consists essentially of calcium chloride.

3. The process of claim 1 wherein the reducing agent consists of a mixture of natural gas and solid carbon.

4. The process of claim 1 in which the basic material is proportioned to correspond stoichiometrically to the halide content of the starting material.

5. The process of claim 3 in which the solid carbon and natural gas are present in excess of the amount required to reduce the zinc oxide present after treatment with the basic material.

6. The process of claim 5 in which the excess of each is not greater than 50% of theoretical.

7. A method of producing a charge-material for a zinc metal producing process, which comprises: simultaneously mixing and reacting a basic material from the group consisting of lime, calcium carbonate, magnesia, dolomite and mixtures thereof with a zinciferous material having a substantial halide and oxide content and selected from the group consisting of zinc drosses, zinc residues, zinc skimmings and reducible zinc compounds, by dry grinding said materials together, and maintaining the temperature below 500° C. while effecting an exothermic reaction between said materials.

8. The process of claim 7 wherein the zinciferous material is zinc skimmings.

9. The process of claim 7 wherein the dry grinding is accomplished by ball milling the basic material and the zinciferous material together.

References Cited in the file of this patent

UNITED STATES PATENTS

| 686,915 | Taquet | Nov. 19, 1901 |
| 702,764 | Babe | June 17, 1902 |
| 714,502 | Meister | Nov. 25, 1902 |
| 869,750 | Terne | Oct. 29, 1907 |
| 1,694,710 | Lenander | Dec. 11, 1928 |
| 1,718,378 | Queneau | June 25, 1929 |